United States Patent [19]
Hatfield et al.

[11] Patent Number: 6,102,858
[45] Date of Patent: Aug. 15, 2000

[54] METHOD AND APPARATUS FOR THREE-DIMENSIONAL ULTRASOUND IMAGING USING CONTRAST AGENTS AND HARMONIC ECHOES

[75] Inventors: William Thomas Hatfield, Schenectady; Kai Erik Thomenius, Clifton Park, both of N.Y.; Anne Lindsay Hall, New Berlin, Wis.

[73] Assignee: General Electric Company, Schenectady, N.Y.

[21] Appl. No.: 09/065,213

[22] Filed: Apr. 23, 1998

[51] Int. Cl.$^7$ ........................................................ A61B 8/00
[52] U.S. Cl. ........................... 600/443; 600/458; 128/916
[58] Field of Search .................................. 600/440, 441, 600/443, 447, 458, 455–456; 128/916

[56] References Cited

U.S. PATENT DOCUMENTS

| | | | |
|---|---|---|---|
| 4,276,885 | 7/1981 | Tickner et al. | 128/660 |
| 5,226,113 | 7/1993 | Cline et al. | 395/124 |
| 5,720,291 | 2/1998 | Schwartz | 128/661.1 |
| 5,833,613 | 11/1998 | Averkiou et al. | 600/440 |
| 5,928,151 | 7/1999 | Hossack et al. | 600/443 |

OTHER PUBLICATIONS

Torp et al., "Comparison Between Cross–Correlation and Auto–Correlation Technique in Color Flow Imaging." Proc. 1993 IEEE Ultrason. Symp., pp. 1039–1042.
Thomas et al., "An Improved Wall Filter for Flow Imaging of Low Velocity Flow, " Proc. 1994 IEEE Ultrason. Symp., pp. 1701–1704.
Ishihara et al., "Path Lines in Blood Flow Using High Speed Digital Subtraction Echography," Proc. 1992 IEEE Ultrason. Symp., pp. 1277–1280.
Ishihara et al., "High–Speed Digital Subtraction Echography: etc.," Proc. 1990 IEEE Ultrason. Symp., pp. 1473–1476.
de Jong et al., "Principles and Recent Developments in Ultrasound Contrast Agents," Ultrasonic, vol. 29, pp. 324–330 (1991).

Newhouse et al., "Second Harmonic Doppler Ultrasound Blood Perfusion Measurement," Proc. 1992 IEEE Ultrason. Symp., pp. 1175–1177.
Burns et al., "Harmonic Power Mode Doppler Using Microbubble Contrast Agents: etc.," Proc. 1994 IEEE Ultrason. Symp., pp. 1547–1550.
Averkiou et al., "A New Imaging Technique Based on the Nonlinear Properties of Tissue," Proc. 1997 IEEE Ultrason. Symp.
Uhlendorf, "Physics of Ultrasound Contrast Imaging: etc.," IEEE Trans. Ultrason. Ferroelec. & Freq. Control, vol. 41, No. 1, pp. 70–79, Jan. (1994).
Shahnazi et al., "Use of Contrast Agents in Ultrasound," Proc. 1994 IEEE Ultrason. Symp., pp. 85–87.
Wang et al., "Contrast Medium Assisted Fluid Flow Measurements," IEEE Trans. Ultrason. Ferroelec. & Freq. Control, vol. 42, No. 2, pp. 309–315, Mar. (1995).

*Primary Examiner*—Francis J. Jaworski
*Attorney, Agent, or Firm*—Marvin Snyder; Douglas E. Stoner

[57] ABSTRACT

A method and an apparatus for displaying three-dimensional images of ultrasound data having improved segmentation. This is accomplished by harmonic imaging. There are two types of harmonic imaging: (1) imaging of harmonics returned from contrast agents injected into the fluid; and (2) naturally occurring harmonics, generally referred to as "tissue harmonics". An ultrasound transducer array is controlled to transmit a beam formed by ultrasound pulses having a transmit center frequency and focused at a desired sample volume containing contrast agents. In the receive mode, the receiver forms the echoes returned at a multiple or submultiple of the transmit center frequency into a beamsummed receive signal. This process is repeated for each sample volume in each one of a multiplicity of scan planes. After filtering out the undesired frequencies in the receive signal, i.e., passing substantially all of the desired (sub) harmonic signals, the ultrasound scanner processes the (sub) harmonic signals to acquire B-mode, velocity or flow power data and then collects that data in a cine memory to form a volume of pixel display data which is used to generate a three-dimensional image.

21 Claims, 7 Drawing Sheets

METHOD AND APPARATUS FOR THREE-DIMENSIONAL ULTRASOUND IMAGING USING CONTRAST AGENTS AND HARMONIC ECHOES

FIELD OF THE INVENTION

This invention generally relates to ultrasound imaging of the human anatomy for the purpose of medical diagnosis. In particular, the invention relates to methods and apparatus for three-dimensional imaging of moving fluid or tissue in the human body by transmitting ultrasound waves into the moving fluid or tissue and detecting ultrasound echoes reflected therefrom.

BACKGROUND OF THE INVENTION

Conventional ultrasound scanners are capable of operating in different imaging modes, such as B mode and color flow mode. In the B mode, two-dimensional images are generated in which the brightness of a display pixel is based on the intensity of the echo return. In color flow imaging, the flow of blood or movement of tissue can be imaged. If movement is present in the object being imaged, a Doppler shift in the return signal (relative to the transmitted signal) is produced which is proportional to the speed of movement.

Ultrasonic scanners for detecting blood flow based on the Doppler effect are well known. Such systems operate by actuating an ultrasonic transducer array to transmit ultrasonic waves into the object and receive ultrasonic echoes backscattered from the object. In the measurement of blood flow characteristics, returning ultrasonic waves are compared to a frequency reference to determine the frequency shift imparted to the returning waves by flowing scatterers such as blood cells. This frequency, i.e., phase shift, translates into the velocity of the blood flow. The blood velocity is calculated by measuring the phase shift from firing to firing at a specific range gate.

The change or shift in backscattered frequency increases when blood flows toward the transducer and decreases when blood flows away from the transducer. The velocity may be displayed using different colors to represent magnitude and direction. The total power in the Doppler spectrum can also be displayed. Color flow images are produced by superimposing a color image of the velocity or power of moving material, such as blood, over a black and white anatomical B-mode image. Typically, color flow mode displays hundreds of adjacent sample volumes simultaneously, all laid over a B-mode image and color-coded to represent each sample volume's velocity or power.

In a conventional ultrasound imaging system (shown in FIG. 1), an ultrasound transducer array 2 is activated to transmit a series of multi-cycle (typically 4 to 8 cycles) tone bursts which are focused at the same transmit focal position with the same transmit characteristics. These tone bursts are fired at a pulse repetition frequency (PRF). The PRF is typically in the kilohertz range. A series of transmit firings focused at the same transmit focal position are referred to as a "packet". Each transmit beam propagates through the object being scanned and is reflected by ultrasound scatterers such as blood cells. The return signals are detected by the elements of the transducer array and then formed into a receive beam by a beamformer 4. The beamformer sums the delayed channels data and outputs either RF or in-phase and quadrature (I/Q) data. The latter alternative is illustrated in FIG. 1. In the conventional system, the frequencies of the beamformer outputs are filtered by a filter 6 and then output, depending on the operating mode, either to a B-mode processor 8 or to a color flow processor, comprising a pair of wall filters 12 and a parameter estimator 14.

In the B mode, an envelope detector incorporated in B-mode processor 8 forms the envelope of the beam-summed receive signal by computing the quantity $(I^2+Q^2)^{1/2}$. The envelope of the signal undergoes some additional B-mode processing, such as edge enhancement and logarithmic compression, to form display data which is output to the scan converter 16.

In the color flow mode, the I/Q components are output to a corner turner memory 10, the purpose of which is to buffer data from possibly interleaved firings and output the data as vectors of points across firings at a given range cell. Data is received in "fast time", or sequentially down range (along a vector) for each firing. The output of the corner turner memory is reordered into "slow time", or sequentially by firing for each range cell. The resultant "slow time" I/Q signal samples are output to the color flow processor, which incorporates respective wall filters 12 that reject any clutter corresponding to stationary or very slow-moving tissue.

Given the angle θ between the insonifying beam and the flow axis, the magnitude of the velocity vector can be determined by the standard Doppler equation:

$$v = cf_d/(2f_0 \cos \theta) \quad (1)$$

where c is the speed of sound in blood, $f_0$ is the transmit frequency and $f_d$ is the motion-induced Doppler frequency shift in the backscattered ultrasound.

The wall-filtered outputs are fed into a parameter estimator 14, which converts the range cell information into the intermediate autocorrelation parameters N, D, and R(0). N and D are the numerator and denominator for the autocorrelation equation, as shown below:

$$N = \sum_{i=1}^{M-1} (I_i Q_{i+1} - I_{i+1} Q_i) \quad (2)$$

$$D = \sum_{i=1}^{M-1} (I_i I_{i+1} + Q_i Q_{i+1}) \quad (3)$$

where $I_i$ and $Q_i$ are the input data for firing i, and M is the number of firings in the packet. R(0) is approximated as a finite sum over the number of firings in a packet, as follows:

$$R(0) = \sum_{i=1}^{M-1} \frac{(I_i^2 + Q_i^2 + I_{i+1}^2 + Q_{i+1}^2)}{2} \quad (4)$$

R(0) indicates the power in the returned ultrasound echoes.

A processor in parameter estimator 14 converts N and D into a magnitude and phase for each range cell. The equations used are as follows:

$$|R(T)| = \sqrt{N^2 + D^2} \quad (5)$$

$$\phi(R(T)) = \tan^{-1}\left[\frac{N}{D}\right] \quad (6)$$

The parameter estimator 14 processes the magnitude and phase values into estimates of power, velocity and turbulence. The phase is used to calculate the mean Doppler frequency, which is proportional to the velocity as shown below; R(0) and |R(T)| (magnitude) are used to estimate the turbulence (variance).

The mean Doppler frequency is obtained from the phase of N and D and the pulse repetition time T:

$$\bar{f} = \frac{1}{2\pi T}\tan^{-1}\left[\frac{N}{D}\right] = \frac{1}{2\pi T}(\phi(R(T))) \qquad (7)$$

The mean velocity is calculated using the Doppler shift equation:

$$\bar{v} = \frac{\bar{f}}{f_0}\frac{c}{2\cos\phi} \qquad (8)$$

The parameter estimator 14 does not calculate the mean Doppler frequency as an intermediate output, but calculates $\bar{v}$ directly from the phase output of a processor using a lookup table.

In general, the display data input to the scan converter 16 is in R-θ format (for a sector scan), which is converted by the scan converter into X-Y format for video display. The scan-converted frames are passed to a video processor 18, which maps the video data to a grey scale and/or color mapping. The grey scale and/or color image frames are then sent to the video monitor 20 for display. Typically, either velocity or power are displayed alone or velocity is displayed in conjunction with either power or turbulence. System control is centered in a host computer (not shown in FIG. 1), which accepts operator inputs through an operator interface (e.g., a keyboard) and in turn controls the various subsystems.

If the ultrasound probe is swept over an area of interest, two-dimensional images may be accumulated to form a three-dimensional data volume. The data in this volume may be manipulated in a number of ways, including volume rendering and surface projections. In particular, three-dimensional images of B-mode (intensity), velocity or power data can be formed by projecting maximum, minimum, average or median pixel values onto an imaging plane.

Three-dimensional reconstructions of B-mode data suffer because the data is difficult to segment due to the lack of contrast and dynamic range. Reconstructions of velocity and power data suffer because associated clutter signals cause errors in segmentation. Thus there is a need for a three-dimensional imaging technique having improved segmentation.

SUMMARY OF THE INVENTION

The present invention is a method and an apparatus for displaying three-dimensional images of ultrasound data having improved segmentation. This is accomplished by harmonic imaging of anatomy with or without contrast agents. There are two types of harmonic imaging: (1) imaging of harmonics returned from contrast agents injected into the fluid; and (2) naturally occurring harmonics, generally referred to as "tissue harmonics".

Tissue harmonics are generally weaker than harmonics from contrast agents, but yield better resolution due to lower side lobes and the fact that one generally chooses to detect the harmonic at a multiple of the fundamental frequency. Patients with a large amount of fatty tissue are generally difficult to image due to the variation of the speed of sound in fat. However, it is a characteristic of fatty tissue that increased amounts of harmonics are generated during sound propagation, making it an advantage with large patients.

Contrast agents have the unique property that they not only produce reflected signals at the frequency of the transmitted ultrasound pulses, but they also produce reflected signals at a harmonic or subharmonic of the transmit frequency. Contrast agents are introduced into the body with the intent of imaging those areas where the agents have reached. Therefore, they are useful in studying flow and perfusion.

In accordance with the preferred embodiment of the invention, an ultrasound transducer array is controlled to transmit a beam formed by ultrasound pulses having a transmit center frequency and focused at a desired sample volume containing contrast agents. In the receive mode, the receiver forms the echoes returned at a multiple or sub-multiple of the transmit center frequency into a beam-summed receive signal. This process is repeated for each sample volume in each one of a multiplicity of scan planes which intersect the region of interest in the object volume.

After filtering out the undesired frequencies in the receive signal, i.e., passing substantially all of the desired (sub) harmonic signals, the ultrasound scanner processes the (sub) harmonic signals to acquire B-mode, velocity or power data and then collects that data in a cine memory to form a volume of pixel display data. To form a three-dimensional image, different types of projection (e.g., pixel projection, surface or composite) can be used. In the case of B-mode data, a maximum, minimum, average or median pixel projection can be performed; in the case of velocity or power data, preferably an average or median pixel projection is performed. A final value is acquired for each ray. Once the projection is complete (i.e., all rays have been tested), the projection is displayed.

In accordance with the invention, (sub)harmonic signals are returned from substantially only those areas where contrast agent (i.e., microbubbles) is present. This simplifies the segmentation of B-mode data to the selection of those areas that produce harmonic or sub-harmonic signals. Velocity and power signals are significantly increased, making it easier to separate the data of interest from background clutter. In addition to (sub)harmonic signals, acoustically stimulated acoustic emissions (ASAE) can be used for segmentation purposes as well. ASAE is a contrast phenomenon which involves bubble destruction and enables imaging of small vessel flow.

DETAILED DESCRIPTION OF THE PREFERRED EMBODIMENTS

Harmonic imaging in accordance with the invention is performed by setting the system to transmit pulses at a predetermined fundamental frequency while receiving at a multiple or sub-multiple of the fundamental frequency. This entails programming the transmit memory of the transmit beamformer to transmit sound at the fundamental (e.g., 2 MHz) and setting filters in each receive channel of beamformer 4 (see FIG. 1) and setting filter 6 to pass a frequency band centered at the harmonic frequency to be detected (e.g., 4 MHz). Filter 6 is preferably an FIR filter programmed with a set of filter coefficients designed so that the filter passes the desired harmonic or subharmonic frequency band.

For reasons which will be described in more detail hereinafter, in some cases it may be advantageous to pass a portion of the fundamental frequency band along with the desired (sub)harmonic frequency band. For example, in certain cases it may be desirable to pass a band of frequencies which encompasses the second harmonic and a contiguous sub-band of the fundamental frequency band. This can be accomplished by programming the filter with filter coefficients which extend the passband in the fundamental domain.

Figure 1:
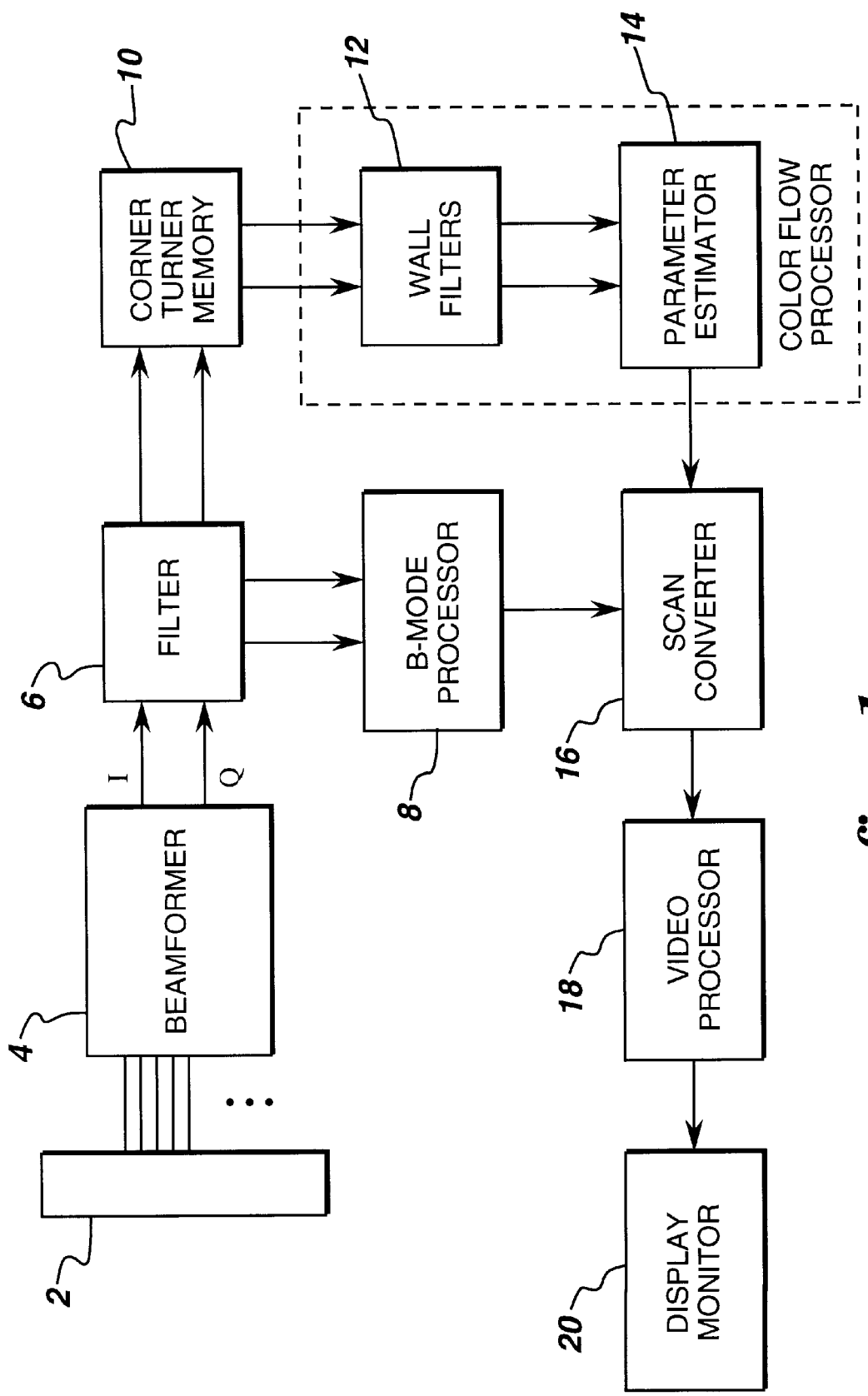
FIG. 1 is a block diagram showing the major functional subsystems within a real-time ultrasound imaging system.

Still referring to FIG. 1, the bandpass-filtered signals are output from filter 6 to one or both of B-mode processor 8 and color flow processor (12, 14). The processed signals are then scan-converted to acquire a frame of pixel display data. Three-dimensional images are formed by reconstructing a multiplicity of image frames stored in cine memory, as explained in detail hereinafter.

Figure 2:
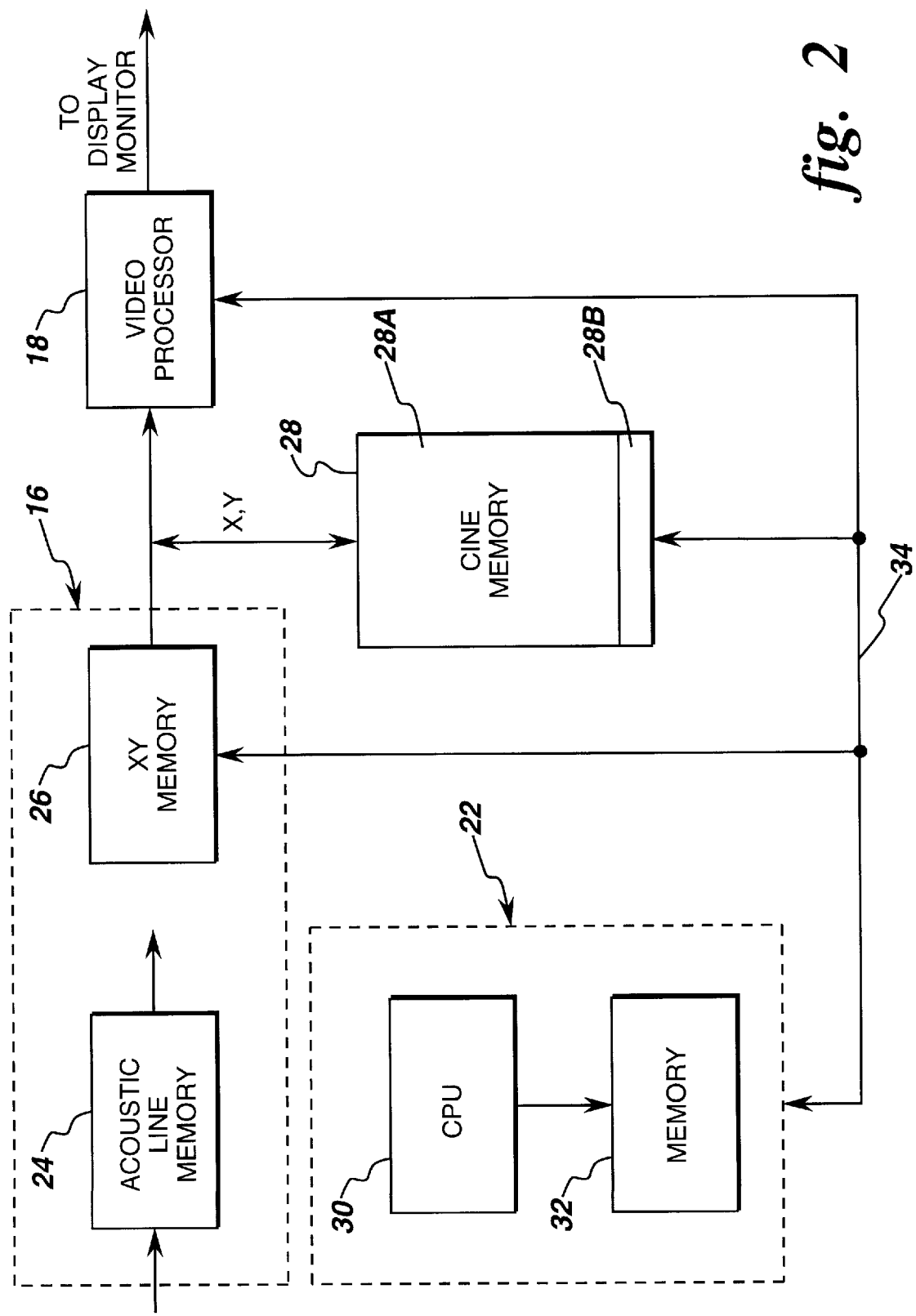
FIG. 2 is a block diagram showing the system for reconstructing frames comprising successive volumetric projections of pixel display data.

Referring to FIG. 2, system control is centered in a master controller or host computer 22, which accepts operator inputs through an operator interface (not shown) and in turn controls the various subsystems. Host computer 22 also generates the system timing and control signals. Scan converter 16 comprises an acoustic line memory 24 and an X-Y memory 26. The data (intensity, velocity or power) stored in polar coordinate (R-θ) sector format in acoustic line memory 24 is transformed to appropriately scaled Cartesian coordinate pixel display data, which is stored in X-Y memory 26. A multiplicity of successive frames of pixel display data are stored in cine memory 28 on a first-in, first-out basis. Cine memory is like a circular image buffer that runs in the background, continually capturing pixel display data that is displayed in real time to the user. When the user freezes the system, the user has the capability to view pixel display data previously captured in cine memory 28.

A conventional ultrasound imaging system collects image frames in cine memory 28 on a continuous basis. Cine memory 28 provides resident digital image storage for single image review and multiple image loop review and various control functions. The region of interest displayed during single-image cine replay is that used during the image's acquisition. The cine memory also acts as a buffer for transfer of images to digital archival devices (not shown) via the host computer 22.

The CPU (central processing unit) 30 has read only memory for storing routines used in transforming an acquired volume of imaging data into a multiplicity of three-dimensional projection images taken at different angles. CPU 30 controls X-Y memory 26 and cine memory 28 via system control bus 34. In particular, CPU 30 controls the flow of data from X-Y memory 26 to video processor 18 and to cine memory 28, and from the cine memory to video processor 22 and to the CPU 30 itself. Each frame of data, representing one of a multiplicity of scans or slices through the object being examined, is stored in X-Y memory 26 and in the next cycle is transmitted to video processor 18 and to cine memory 28. A stack of frames, representing the scanned object volume, is stored in section 28A of cine memory 28. In response to initialization (step 36 in FIG. 3), CPU 30 retrieves from cine memory section 28A only the pixel display data corresponding to an object volume of interest. This is accomplished by retrieving only the data in a region of interest from each selected frame. The data corresponding to the region of interest from each one of a multiplicity of selected frames forms a source data volume of interest, which is stored in local memory (step 38 in FIG. 3).

Conventional two-dimensional ultrasound images are formed from a combination of fundamental and harmonic signal components, the latter of which are generated in a nonlinear medium such as tissue or a blood stream containing contrast agents. In accordance with the present invention, segmentation in three-dimensional ultrasound images is improved by suppressing all or a substantial portion of the fundamental signal components and passing substantially all of the desired harmonic signal components.

In accordance with one preferred embodiment of the invention, the injection of contrast agents into the object volume of interest is combined with harmonic bandpass filtering of the receive signals. Contrast agents have been developed for medical ultrasound to aid in diagnosis of traditionally difficult-to-image vascular anatomy. For example, the use of contrast agents is discussed by de Jong et al. in "Principles and Recent Developments in Ultrasound Contrast Agents," Ultrasonics, Vol. 29, pp. 324–380 (1991). The agents, which are typically microbubbles whose diameter is in the range of 1–10 micrometers, are injected into the blood stream. Since the backscatter signal of the microbubbles is much larger than that of blood cells, the microbubbles are used as markers to allow imaging of blood flow. One method to further isolate echoes from these agents is to use the (sub)harmonic components of the contrast echo, which is much larger than the harmonic components of the surrounding tissue without contrast agent. [See, e.g., Newhouse et al., "Second Harmonic Doppler Ultrasound Blood Perfusion Measurement," Proc. 1992 IEEE Ultrason. Symp., pp. 1175–1177; and Burns, et al., "Harmonic Power Mode Doppler Using Microbubble Contrast Agents: An Improved Method for Small Vessel Flow Imaging," Proc. 1994 IEEE Ultrason. Symp., pp. 1547–1550.] Flow imaging of (sub) harmonic signals has largely been performed by transmitting a narrowband signal at frequency $f_0$ and receiving at a band centered at frequency $2f_0$ (second harmonic) or at frequency $f_0/2$ (subharmonic) followed by conventional processing.

In accordance with a preferred embodiment which does not rely on injection of contrast agents, the receive signals from (sub)harmonic-producing human tissue are bandpass-filtered to pass the desired (e.g., second) harmonic for subsequent three-dimensional reconstruction.

For both embodiments, a bandpass filter centered at a (sub)harmonic frequency substantially isolates the desired (sub)harmonic component. For example, filter 6 (see FIG. 1) is preferably an M-tap FIR filter. A set of (sub)harmonic filter coefficients $c_0, c_1, \ldots, c_{M-1}$ are selected so that the M-tap FIR filter passes a major fraction of the desired harmonic or subharmonic frequencies in the receive signal. If the transmitted center frequency is at $f_0$, then tissue/contrast non-linearities will generate harmonics at $kf_0$, where k is an integer greater than or equal to 2. Also, subharmonics at frequencies $f_0/k$ may be generated by contrast bubble destruction. In the preferred embodiment, the second harmonic signal is imaged. On transmit, the transmit signal must have a bandwidth narrow enough to allow the second harmonic to also fit within the transducer bandwidth.

To accomplish three-dimensional ultrasound imaging, the pixel projections are reconstructed in CPU 30, which performs a series of transformations using the ray-casting algorithm disclosed in U.S. Pat. No. 5,226,113. The successive transformations represent maximum, minimum, average or median velocity projections made at angular increments, e.g., at 10° intervals, within a range of angles, e.g., +90° to −90°. However, the angular increment need not be 10°; nor is the invention limited to any particular range of angles.

Figure 4:
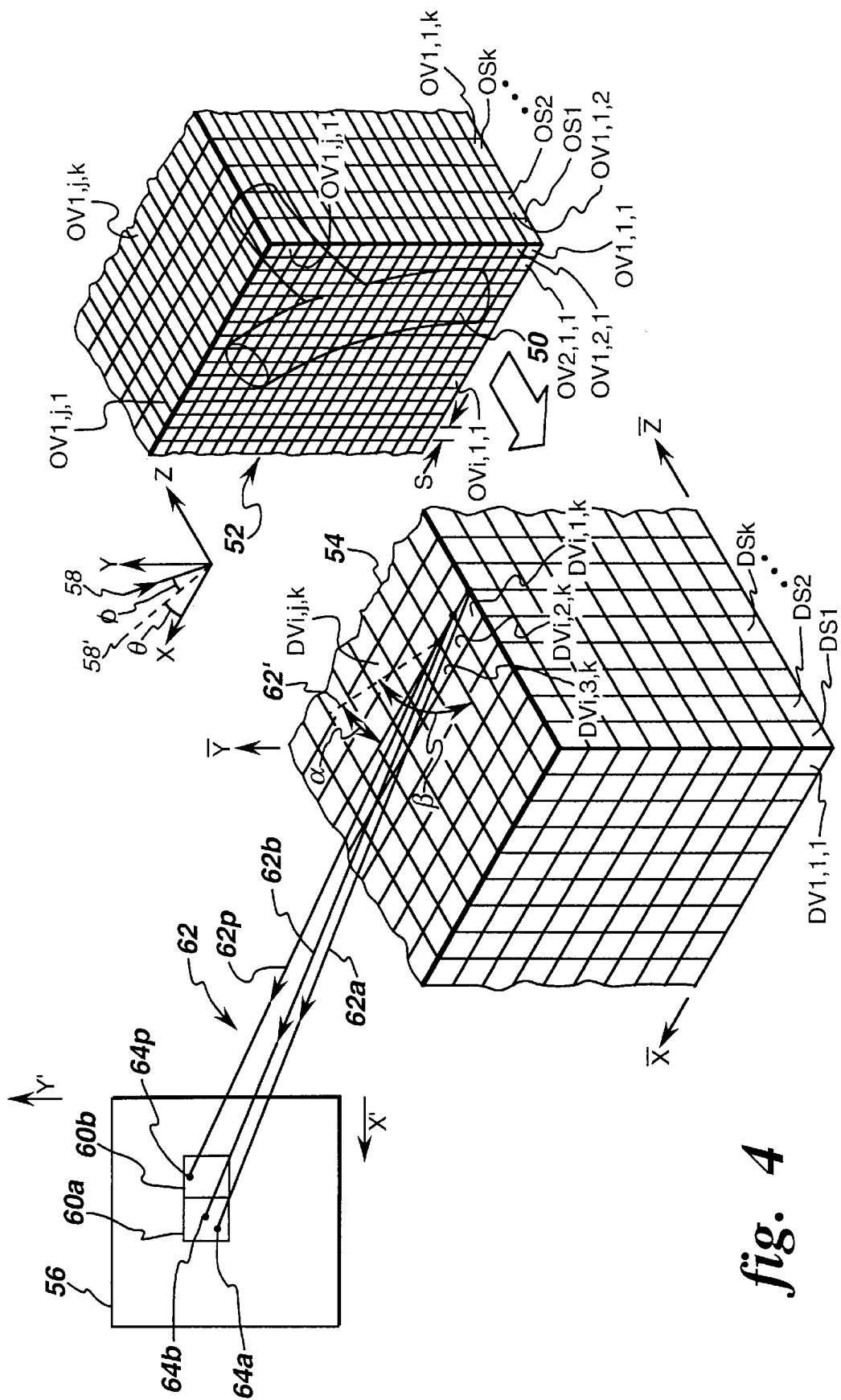
FIG. 4 is a schematic showing of the sampled object volume of interest, an associated data volume and an image projection plane involved in volumetrically rendering a reversed ray-cast projection.

In accordance with the ray casting technique employed in the present invention, volumetrically rendered projection images of a sample 50 (see FIG. 4) is displayed from any arbitrary viewing angle, e.g. a spherical projection angle denoted by angle parameters (θ,φ), where θ is the angle that an extension 58' of a viewing ray 58 makes upon the X-Y plane, and φ is the angle of ray 58 with respect to extension 58', by scanning an object volume 52 an ultrasound transducer. Sample volume 52 is scanned in such a manner as to create a series of stacked, contiguous slices or sheets $OS_1$, $OS_2$, ..., $OS_k$, each of which contains the same number of object volume elements (voxels) OV. Each voxel has a rectangular profile in the sheet plane (say, the X-Y plane); while the complementary sides may be of equal length S, so that this profile may be square, the sheet thickness T is generally not equal to the length of either side. Thus, the first object slice $OS_1$ contains a first multiplicity of object voxels $OV_{i,j,1}$, where i and j are the respective X-axis and Y-axis positions of the voxel. Similarly, the second object slice $OS_2$ contains object voxels $OV_{i,j,2}$. An arbitrary object slice $OS_k$ contains voxels $OV_{i,j,k}$, where k is the Z-axis position of that voxel.

Each object voxel $OV_{i,j,k}$ is analyzed and the data value (intensity, velocity or power) thereof is placed in a corresponding data voxel $DV_{i,j,k}$ of a data volume 54. Data volume 54 is a simple cubic i,j,k lattice, even though the thickness of each object slice $OS_k$ and each object voxel face size (the size of the voxel in the X-Y plane) will generally not be the same. That is, not only may the object volume have different X, Y and Z dimensions for each voxel, but also the total number of voxels in any dimension need not be the same. For example, a typical ultrasound three-dimensional scan may provide each slice with a 256×256 matrix of voxels, and may involve 128 slices.

In accordance with a known technique employed by CPU 30, an image of object 50 is projected (step 42 in FIG. 3) by ray casting toward image plane 56 from a lattice point in data voxel $DV_{i,j,k}$. For convenience, the lattice point may, for example, be the data voxel vertex closest to the data volume origin. The cast ray 62 leaves data volume 54 at a projection angle with spherical angular parameters (α,β) transformed from the spherical angular parameters (θ, φ) at which object volume 52 is viewed. These two angles are not the same, due to the geometric distortion caused by use of a cubic data volume 54 with a non-cubic object volume 52. However, projected ray 62 has an $\overline{x}$-$\overline{y}$ plane extension 62' which makes an angle α with respect to the $\overline{x}$ axis of the data volume, and ray 62' makes an angle β with the $\overline{z}$ axis. Thus, angles α and β are determined by a rotation process (to be discussed hereinbelow) to correspond to viewing object volume 52 at the desired viewing angle (θ, φ) (assuming operation in spherical coordinates). Each of rays 62 is cast from the data volume voxel lattice point toward the image plane.

While all rays 62 impinge upon some portion of the image plane, only those rays falling within the image plane pixel 60a under consideration are allowed to contribute to the data for that image plane pixel. Thus, having chosen a portion of object volume 52 to view and a viewing angle (θ, φ) at which to view this selected object volume, the data value in each voxel of the corresponding portion of the data volume is cast at some angle (α, β) (corresponding to viewing the distorted data volume with respect to the object volume) toward image plane 56. The data value in a first voxel (say, voxel $DV_{i,1,k}$) is thus back-projected along ray 62a, in accordance with the θ and φ values chosen. This ray 62a impinges upon image plane 56 at a position 64a within pixel 60a, and, as this is the first ray to impinge upon this pixel, the value of the incident data is attributed to (stored in) the desired pixel 60a. The next voxel in the data volume (say voxel $DV_{i,2,k}$) has its associated ray 62b projected at the same angular (α,β) configuration from the voxel lattice point, and its position 64b upon image plane 56 is noted. Assuming that impingement position 64b is within desired pixel 60a, the second projected value is (for a maximum pixel projection) compared with the now stored first value and the larger value is placed in storage for pixel 60a. As each voxel in the selected data volume is sequentially entered and projected toward image plane 56, a data volume voxel (say, voxel $DV_{i,3,k}$) is eventually projected along its associated ray 62p and does not impinge within the desired pixel 60a, so that its data value is not compared to the data value presently stored for pixel 60a. The maximum data value for pixel 60a is now established, for that projection of the data at the particular (θ, φ) three-dimensional angle of view. However, the ray 62p does, in fact, have an impingement point 64p which falls within another image plane pixel (say, pixel 60b) and is compared to the data value stored therein and the larger value is, after the comparison, returned to storage for that pixel. All data values are reset to zero when a new projection is to be taken. Thus, each of the image plane pixels is reset at the start of an image projection procedure, and all of the data volume voxels (in the entire space or in the selected portion, as set by the portion of the object volume 52 selected) are individually and sequentially scanned. The data value in each data voxel DV is projected through an associated ray 62 to impinge upon image plane 56 in one pixel 60 thereof, with the maximum value in each pixel being compared between the present value of the ray-casted data volume voxel, to determine the larger thereof, which larger value is then stored as part of the maximum value image. In practice, for a maximum pixel projection, the stored maximum value will be changed only if the newly cast data voxel value is greater than the data value already stored for the image plane pixel upon which the newly cast ray impinges.

Figure 5:
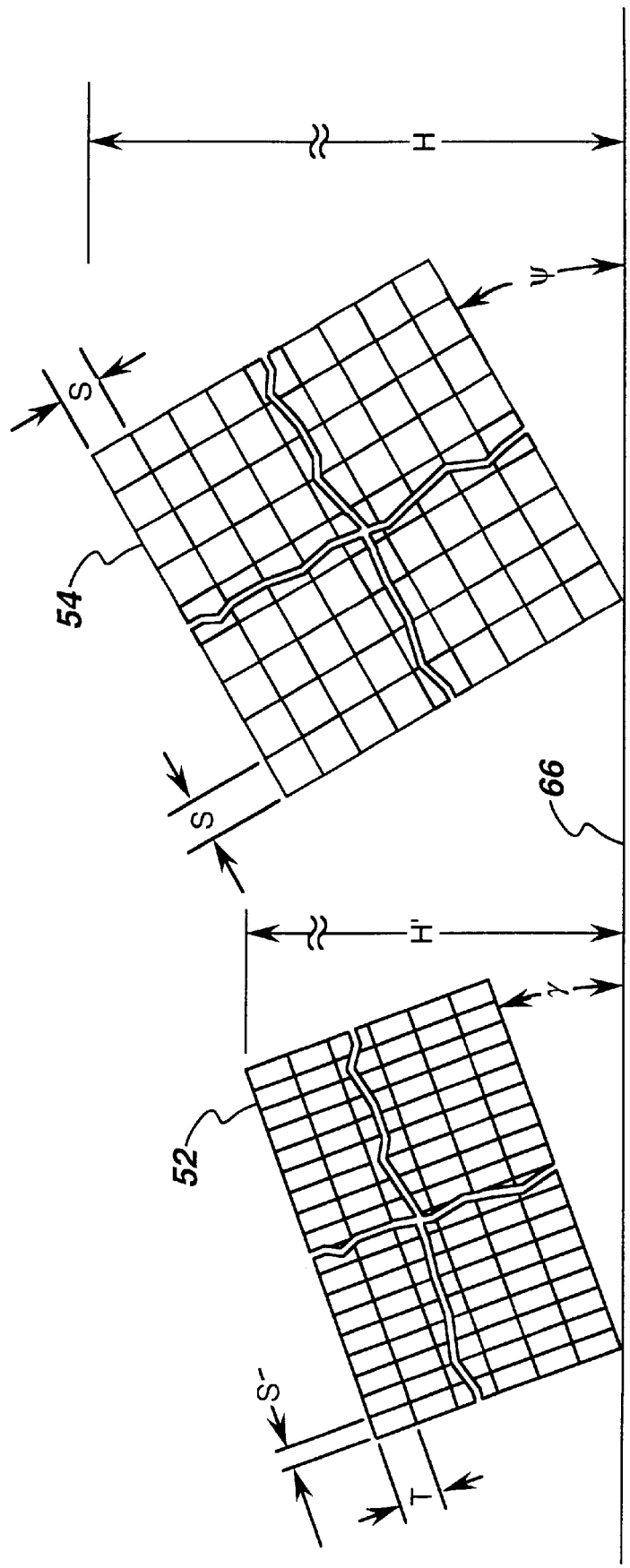
FIG. 5 is a schematic showing of a pair of geometric two-dimensional configurations corresponding to like views of object and data volumes, and useful in defining necessary scaling constants in three-dimensional ultrasound imaging.

In accordance with another aspect of the foregoing technique, the data projection is scaled (step 44 in FIG. 3) and any anisotropy between the object volume and the image plane is removed by only a single set of calculations after back projection is complete. Referring now to FIG. 5, because object volume 52 is a real volume while data volume 54 is an abstract concept, it is necessary to determine the amount of distortion of the data projection due to the presentation of the cubic data volume lattice 54 at a different angle γ, in a first plane, and then the angle ψ at which an arbitrary viewing direction 66 will be positioned with respect to both the object volume 52 and data volume 54. The apparent dimensions of each voxel are going to change as the effective elevation angles ψ and γ change. If the aspect ratio A (defined as the ratio of the actual slice thickness T in object volume 52 to the actual pixel size S in the same object volume 52) is not unity (i.e., is greater or less than unity, as the object voxel is not a cubic voxel, as will be encountered in data volume 54), then the angles ψ and γ of elevation will be different, and the effective elevation angle ψ in the data volume will be different than the actual elevation angle γ in the object volume. Rotation of the data is in accordance with an object elevation angle obtained by:

$$\psi = \tan^{-1}\left(\frac{1}{A}\tan[\gamma]\right)$$

Thereafter, the projected data can be scaled to have the correct height (if rotation is about the horizontal axis) in the object volume, by multiplication of all projected data heights by the elevation scale factor. The old projected image height H can be corrected with an effective scale factor $E_s$, where $$E_s = \sqrt{(A\cos\gamma)^2 + \sin^2\gamma}$$

and the new height $H'=H \cdot E_s$. The same is true for the width when rotation is about the vertical axis.

Utilizing the above relationship, the rotation of data volume angles (α,β) becomes angles (θ, φ), because the distortion is only along one axis, so that angle θ equals angle α. The elements of the 3×3 rotational matrix [M] can be determined, and given the two involved rotational angles, these relationships are used to determine the data volume-to-image plane transformations:

$$X'=M1X+M2Y+M3Z=XO$$

$$Y'=M4X+M5Y+M6Z+YO$$

where M1–M6 are the first two rows of the rotational matrix (i.e., M1=−sin θ, M2=cos θ sin ψ, M3=0, M4=−cos θ sin ψ2, M5=−sin θ sin ψ, and M6=cos ψ), X' and Y' are the locations on the image plane of the projected point, and XO and YO are image plane X and Y offsets (respectively referenced to the X and Y lowest value points) at which the selected portion of the image plane begins. After the data is projected onto image plane 56, the image is scaled to correct for the effect of the anisotropic object voxels. It will be seen that factors M1–M6 can be precalculated (step 40 in FIG. 3) at the beginning of a projection (given θ, and φ) and used for all rotation calculations.

Figure 6:
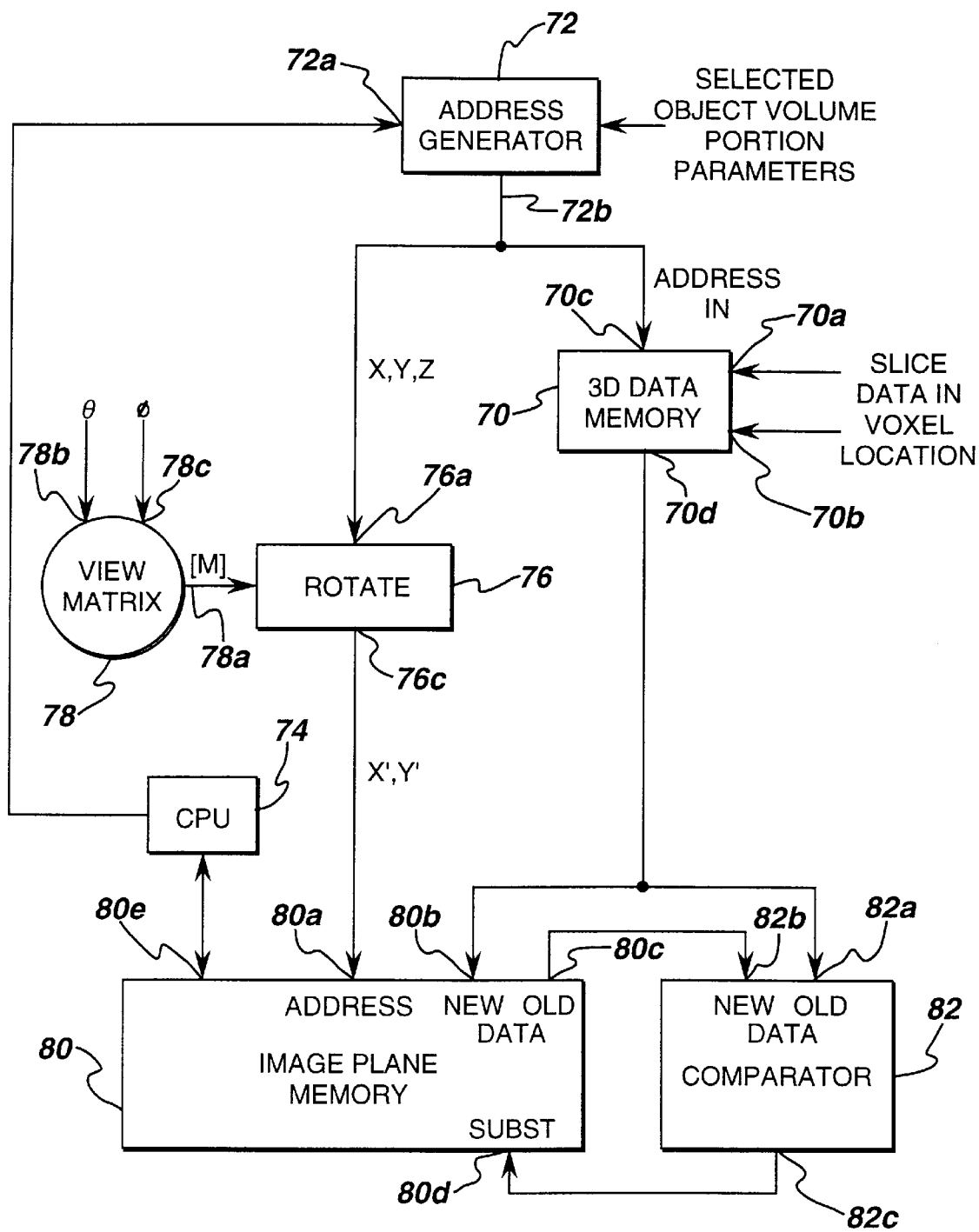
FIG. 6 is a block diagram of a system for providing a maximum intensity projection in three-dimensional ultrasound imaging.

FIG. 6 shows a system for performing the above-described ray-casting technique which are incorporated in the host computer 22 (or a separate dedicated processor). Such system comprises a three-dimensional data memory 70 for storing slice data as received at a data input 70a from cine memory 24. The data associated with each object voxel is stored at the address of that voxel, responsive to voxel address input information received at a voxel address input 70b from a CPU 74. Once the data memory means is filled (corresponding to the transfer of all required data from object volume 52 to data volume 54), the object volume portion of interest is selected and data establishing its starting corner and extent in the X, Y and Z directions is sent from CPU 74 to an input 72a of an address generator 72. Address generator 72 sequentially provides, at an address output 72b, the X,Y,Z addresses of each voxel within the object volume selected. Output 72b is connected to an output-data-address input 70c of data memory 70, causing the stored data for that one voxel then addressed to be output from data memory output 70d. The sequence of voxel X,Y,Z addresses is also provided to a first input 76a of a rotational parameter computer 76, which receives angle (α,β) information via CPU 74 as the calculated matrix element M1–M6 values, to provide at an output 76c the address X',Y' of the image plane pixel corresponding to that object X,Y,Z pixel when viewed at a selected viewing angle (θ, φ). The viewing angle (θ, φ) information is entered into the system and processed by CPU 74. The results are entered into inputs 78b and 78c of a viewing matrix 78, to provide matrix elements M1–M6 at its output 78a and thence to rotational computer 76. The image plane pixel address X',Y' appears at an address input 80a of a frame buffer acting as an image plane memory 80. Simultaneously, the pixel display data, projected from the data volume to the projection plane, appears at the image plane memory new data input 80b, from three-dimensional data memory output 70d. This data also appears at the new data input 82a of a data comparator 82. Pixel display data previously saved in the image plane memory 80 for that address, at input 80a, appears at an old data output 80c, and thence at an old data input 82b of the comparator. The old and new data at inputs 82b/82a, respectively, are compared in comparator 82 and an output 82c thereof is enabled to a selected logic condition (e.g., a high logic level) if the new data at input 82a has greater amplitude than the old data at input 82b. Output 82c is connected to a substitute-control data input 80d of the image plane memory, to cause the data stored at the address controlled by input 80a to be changed to accept the new data at input 80b, if the substitute-data control input 80d is at the selected logic level. Thus the stored data is initially reset, as by a signal through a data/control port 80e (from CPU 74), and the data of greatest value is stored for each image plane pixel location X',Y' responsive to a comparison indicating that the new data exceeds the value of the previously stored old data. After all of the selected addresses are sequentially scanned by address generator 72, the data stored in image plane memory 80 is scaled in CPU 74, and the scaled image plane data can be withdrawn from memory 80 for display, permanent storage or similar purposes.

Figure 7:
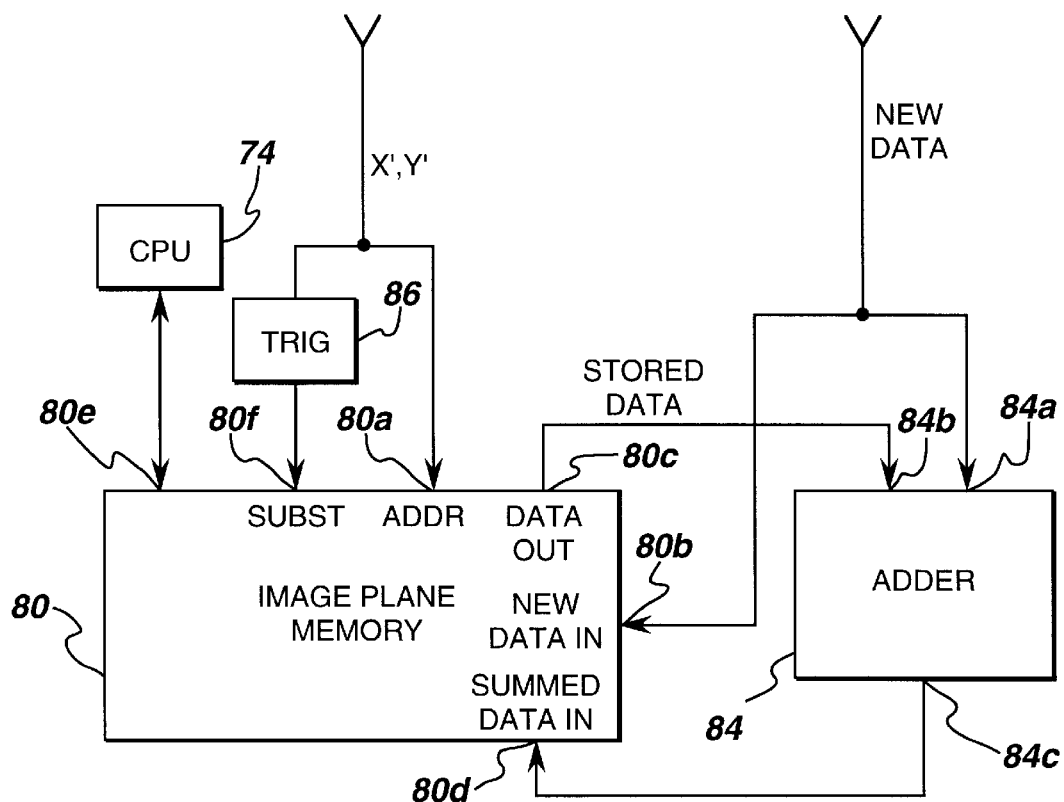
FIG. 7 is a block diagram of a system for providing an average or median intensity projection in three-dimensional ultrasound imaging.

For velocity and power data, an average or median pixel projection is preferably used. FIG. 7 depicts a system for providing an average or median intensity projection. The system depicted in FIG. 7 differs from those shown in FIG. 6 in that adder 84 replaces data comparator 82 and trigger 86 has been added. For an understanding of FIG. 7, it should also be appreciated that the line labeled NEW DATA is connected to the output of 3D data memory 70 shown in FIG. 6 and the line labeled X',Y' is connected to the output of rotational parameter computer 76 shown in FIG. 6.

For an averaged-value projection, the value of a current projected data voxel is added to the sum already stored for the image panel pixel upon which that projection ray impinges, and the sum is eventually divided by a counted number of such impinging rays for that pixel. As each voxel in the selected data volume is sequentially entered and projected toward image plane 56, a data volume voxel (say, voxel $DV_{i,3,k}$) is eventually projected along its associated ray 62p and does not impinge within the desired pixel 60a, so that its data value is not added to the summed value presently stored for pixel 60a. The average data value for pixel 60a is then computed for that projection of the data at the particular (θ, φ) three-dimensional angle of view. However, ray 62p does, in fact, have an impingement point 64p which falls within another image plane pixel (say, pixel 60b) and is added to the summed data value stored therein. All data values are reset to zero when a new projection is to be taken. Thus, each of the image plane pixels is reset at the start of an image projection procedure, and all of the data volume voxels (in the entire space or in the selected portion, as set by the portion of object volume 52 selected) are individually and sequentially scanned. The data value in each data voxel DV is projected through an associated ray 62 to impinge upon image plane 56 in one pixel 60 thereof. Then the average value or median value or both are computed for each pixel and displayed.

The average intensity of each image plane pixel can be found by the following methodology. For each object volume voxel address X,Y,Z, new data is applied to data input 84a of adder 84. Simultaneously, address X',Y' appears at the address input 80a of image plane memory 80. The appearance of new address data is sensed by a trigger 86, to provide a substitute-data signal at input 80f. This signal occurs with a sufficient delay so that data previously stored at that address in image plane memory 80 is retrieved and applied to data input 84b of adder 84 via data output 80c of image plane memory 80. The adder forms the sum of the new and stored data. That sum is made available at the output 84c of adder 84, which is connected to the summed data input 80d of image plane memory 80. The summed data is stored at address X',Y' in image plane memory 80, for that pixel of the image plane, until all of the object volume voxels in the volume of interest have been scanned, and have made their contribution to the associated pixels of the image plane. The image plane pixel sum values are then operated upon by CPU 74 via data port 80e of image plane memory 80, in accordance with the number of additions for each image plane pixel (which is a number obtained by adding activations of input 80d for each pixel and is also stored in image plane memory 80) to derive the average intensity for each image plane pixel for storage and subsequent display. In the color flow mode, the averaged pixel value represents either average velocity or the flow power contained in the returned Doppler signal.

In accordance with an alternative embodiment, median pixel projections are performed by storing respective lists of the projected values for each pixel on the image frame and then discriminating the respective median pixel value for each pixel after all of the object volume voxels in the volume of interest have been scanned. These median values are then displayed. It will be appreciated by persons skilled in the art that for median pixel projections, the new data from output 70d is input to a new data input 80b of image plane memory means 80. The data values are ordered in a median table by CPU 74, which also later discriminates the median value from the values contained in the table.

In accordance with a further variation, both the average and the median values are computed and stored for each pixel projection. A selection algorithm is then applied to the average and median values for each pixel to determine which value is to be used in the projected image to be displayed. For some applications, a selection algorithm which selects the larger of the two values may be used. For other applications, a selection algorithm which selects the smaller of the two values may be used.

Figure 3:
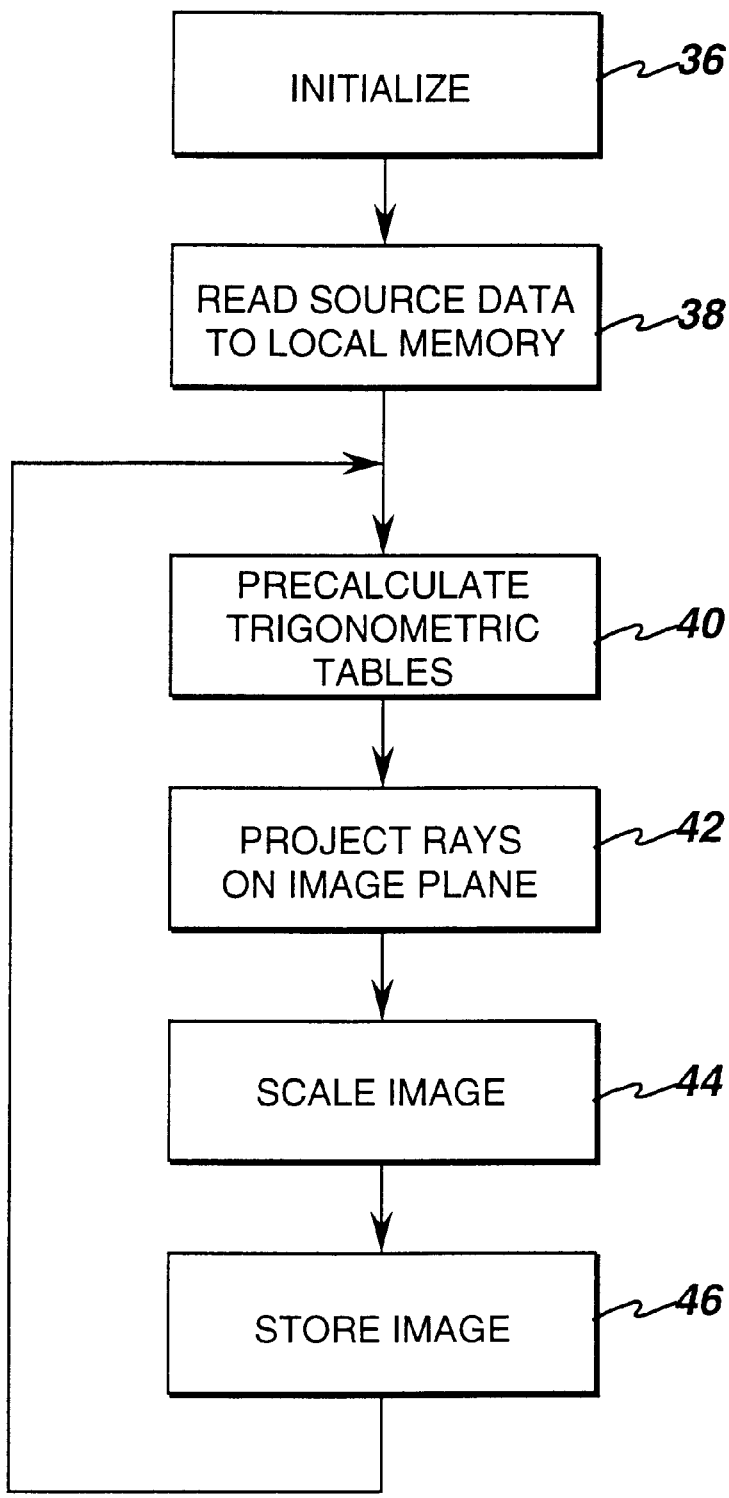
FIG. 3 is a flowchart showing the steps of an algorithm for reconstructing frames comprising successive volumetric projections of pixel display data.

In accordance with the invention, the method shown in FIG. 3 is applied to the intensity, velocity or flow power data for the data volume of interest retrieved from the cine memory. Each pixel in the projected image includes a respective transformed datum derived by projection onto a given image plane. In addition, at the time when the cine memory was frozen by the operator, CPU 30 stored the last frame from X-Y memory 26 at multiple successive addresses in section 28B of cine memory 28. The projected pixel display data for the first projected view angle is written into the first address in cine memory section 28B, so that the projected pixel display data in a region of interest is superimposed on the background frame. This process is repeated for each angular increment until all projected images are stored in cine memory section 28B, each projected image frame consisting of a region of interest containing transformed data and, optionally, a background perimeter surrounding the region of interest consisting of background frame data not overwritten by region-of-interest transformed data. The background image makes it clearer where each displayed projection is viewed from. The operator can then select any projected image for display. In addition, the sequence of projected images can be replayed on the display monitor to depict the object volume as if it were rotating in front of the viewer. By allowing some of the fundamental signal through the harmonic isolation (bandpass) filter, anatomical landmarks which do not harmonic reflections can be imaged and observed during medical diagnosis.

Images are collected in cine memory on a continuous basis. As the probe is swept over an area of the anatomy either by freehand scanning or using a system for moving the probe, a three-dimensional volume may be obtained. The position of each image with respect to the next may be determined in a number of ways. The probe may be scanned in some manner such as by moving the probe linearly, by rocking the probe through an angle, rotating the probe through an angle perpendicular to the probe face, etc. If the probe is translated at a constant rate, over a known distance or through a known range of angles, the distance between each image can easily be determined. The distance the probe was translated may be determined in a number of ways, such as by simply measuring the distance with a suitable measurement device, using markers on or within the anatomy, or by attaching position sensors to the probe. The probe may also be moved through an arbitrary path and the data from position sensors mounted on the probe may be used to determine the location of each image. These images may then be placed on a Cartesian volume. In addition, the probe may be fixed in a device which moves the probe through a known path.

As used herein, the term "(sub)harmonic modes" encompasses harmonic modes having frequencies which are a multiple of the fundamental transmit frequency and subharmonic modes having frequencies which are a sub-multiple of the fundamental transmit frequency.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A system for three-dimensional imaging of an object volume containing ultrasound scatterers, comprising:
   an ultrasound transducer array for transmitting ultrasound beams having a fundamental frequency and detecting ultrasound echoes reflected from said object volume at a multiplicity of sample volumes;
   (sub)harmonic mode acquisition means for acquiring (sub)harmonic mode data derived from ultrasound echoes of said ultrasound beams reflected from the sample volumes, each (sub)harmonic mode datum corresponding to a respective one of said multiplicity of sample volumes, and said (sub)harmonic mode being a multiple or sub-multiple of said fundamental frequency;
   a memory for storing (sub)harmonic mode data for each of said multiplicity of sample volumes;

means for retrieving a source (sub)harmonic mode data set from the (sub)harmonic mode data stored in said memory means;

a controller for determining a projected value for each pixel of a first image frame, said projected values being computed by projecting the (sub)harmonic mode data in said source (sub)harmonic mode data set onto a first image plane in accordance with a predetermined function, thereby forming a first projected data set;

a display monitor; and a processor for displaying a first projected image on said display monitor, wherein said first projected image is a function of at least a portion of said first projected data set.

2. The system as defined in claim 1, wherein said (sub)harmonic mode acquisition means comprises a bandpass filter which passes substantially all of a desired (sub)harmonic frequency band.

3. The system as defined in claim 2, wherein said bandpass filter also passes a sub-band of a fundamental frequency band centered at said fundamental frequency, said sub-band being contiguous with said desired (sub)harmonic frequency band.

4. The system as defined in claim 1, wherein said (sub)harmonic mode data is B-mode intensity data.

5. The system as defined in claim 4, wherein said predetermined function is maximization.

6. The system as defined in claim 4, wherein said predetermined function is minimization.

7. The system as defined in claim 1, wherein said (sub)harmonic mode data is velocity data.

8. The system as defined in claim 7, wherein said predetermined function is averaging.

9. The system as defined in claim 7, wherein said predetermined function is determining a median value.

10. The system as defined in claim 1, wherein said (sub)harmonic mode data is flow power data.

11. The system as defined in claim 10, wherein said predetermined function is averaging.

12. The system as defined in claim 10, wherein said predetermined function is determining a median value.

13. The system as defined in claim 1, wherein said controller is further adapted to determine a projected value for each pixel of a second image frame, said projected values being computed by projecting the (sub)harmonic mode data in said source (sub)harmonic mode data set onto a second image plane, which is rotated relative to said first image plane, in accordance with said predetermined function, thereby forming a second projected data set; and wherein said processor is further adapted to display a second projected image on said display monitor, wherein said second projected image is a function of at least a portion of said second projected data set.

14. A method for three-dimensional imaging of an object volume containing ultrasound scatterers, comprising the steps of:

transmitting ultrasound beams into said object volume;

detecting ultrasound echoes reflected from said object volume at a multiplicity of sample volumes;

acquiring (sub)harmonic mode data derived from ultrasound echoes of said ultrasound beams reflected from the sample volumes, each (sub)harmonic mode datum corresponding to a respective one of said multiplicity of sample volumes, and said (sub)harmonic mode being a multiple or sub-multiple of said fundamental frequency;

storing (sub)harmonic mode data for each of said multiplicity of sample volumes;

retrieving a source (sub)harmonic mode data set from the stored (sub)harmonic mode data;

for each pixel of a first image frame, determining a projected value computed by projecting the (sub)harmonic mode data in said source (sub)harmonic mode data set onto a first image plane in accordance with a pre-determined function, thereby forming a first projected data set; and displaying a first projected image which is a function of at least a portion of said first projected data set.

15. The method as defined in claim 14, wherein said step of acquiring (sub)harmonic mode data comprises the step of bandpass filtering to pass substantially all of a desired (sub)harmonic frequency band.

16. The method as defined in claim 15, wherein said step of bandpass filtering further comprises the step passing a sub-band of a fundamental frequency band centered at said fundamental frequency, said sub-band being contiguous with said desired (sub)harmonic frequency band.

17. The method as defined in claim 14, wherein said (sub)harmonic mode data is B-mode intensity, velocity or flow power data.

18. The method as defined in claim 17, wherein said predetermined function is maximization, minimization, averaging or determining a median value.

19. The method as defined in claim 14, further comprising the steps of:

for each pixel of a second image frame, computing a projected value by projecting the (sub)harmonic mode data in said source (sub)harmonic mode data set onto a second image plane, which is rotated relative to said first image plane, in accordance with said predetermined function, thereby forming a second projected data set; and displaying a second projected image which is a function of at least a portion of said second projected data set.

20. A method for imaging ultrasound scatterers in an object volume containing a fluid medium, comprising the steps of:

injecting a contrast agent into the fluid medium in said object volume;

transmitting ultrasound beams into said object volume;

detecting ultrasound echoes reflected from said object volume at a multiplicity of sample volumes;

acquiring (sub)harmonic mode data derived from ultrasound echoes of said ultrasound beams reflected from the sample volumes, each (sub)harmonic mode datum corresponding to a respective one of said multiplicity of sample volumes, and said (sub)harmonic mode being a multiple or sub-multiple of said fundamental frequency;

storing (sub)harmonic mode data for each of said multiplicity of sample volumes;

retrieving a source (sub)harmonic mode data set from the stored (sub)harmonic mode data;

for each pixel of an image frame, determining a projected value computed by projecting the (sub)harmonic mode data in said source (sub)harmonic mode data set onto an image plane in accordance with a predetermined function, thereby forming a projected data set; and displaying a projected image which is a function of at least a portion of said projected data set.

21. The method as defined in claim 20, wherein said (sub)harmonic mode data is B-mode intensity data, velocity data or flow power data.

* * * * *